United States Patent
Margot

[19]

[11] Patent Number: 6,129,120
[45] Date of Patent: Oct. 10, 2000

[54] PIPE-ARRANGEMENT

[75] Inventor: Christian Margot, Besancon, France

[73] Assignee: Frankische Rohrwerke Gebr. Kirchner GmbH & Co., Bayern, Germany

[21] Appl. No.: 09/285,862

[22] Filed: Apr. 2, 1999

[30] Foreign Application Priority Data

Apr. 3, 1998 [DE] Germany ............................ 198 15 137

[51] Int. Cl.[7] .................................................. F16L 11/00
[52] U.S. Cl. ........................ 138/121; 138/128; 138/155; 138/158; 138/177
[58] Field of Search ..................... 138/109, 121, 138/122, 120, 128, 155, 156, 157, 158, 177

[56] References Cited

U.S. PATENT DOCUMENTS

| | | | |
|---|---|---|---|
| 3,699,684 | 10/1972 | Sixt | 138/96 R |
| 3,878,685 | 4/1975 | Schmunk | 138/178 |
| 4,214,147 | 7/1980 | Kraver | 138/128 |
| 4,360,104 | 11/1982 | Lang | 138/109 |
| 4,374,596 | 2/1983 | Schlemmer et al. | 138/155 |
| 4,970,351 | 11/1990 | Kirlin | 138/137 |
| 5,160,811 | 11/1992 | Ritzmann | 138/156 |
| 5,305,799 | 4/1994 | Pal Palu | 138/109 |
| 5,463,187 | 10/1995 | Battle | 138/155 |
| 5,762,108 | 6/1998 | Hunter | 138/109 |
| 5,799,703 | 9/1998 | Kanao et al. | 133/177 |

*Primary Examiner*—James Hook
*Attorney, Agent, or Firm*—Weingarten, Schurgin, Gagnebin & Hayes LLP

[57] ABSTRACT

The invention relates to a pipe arrangement with a corrugated pipe (10*a*, 10*b*) which has a slit (14) in axial direction, whereby, in accordance with the invention, at least one pipe section (22*a*, 22*b*) is provided with corrugations, which can be brought into engagement with the corrugated pipe over an axially extending portion, whereby the pipe section includes a longitudinal slit (24) and, thus, can be positioned onto or inserted into the corrugated pipe so that the slit (14) in the latter is covered. This provides a simple pipe arrangement which can be easily and economically produced and does not exert undue stress on the cables or conduits therein or branching off therefrom.

20 Claims, 6 Drawing Sheets

Fig. 4
A)
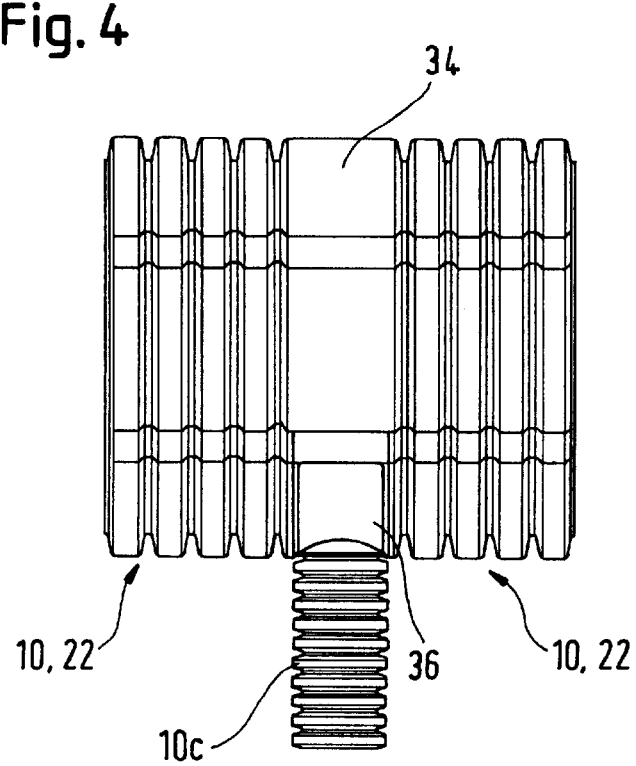
B)
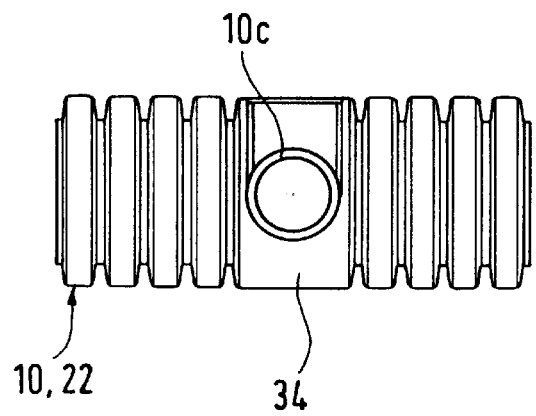
C)
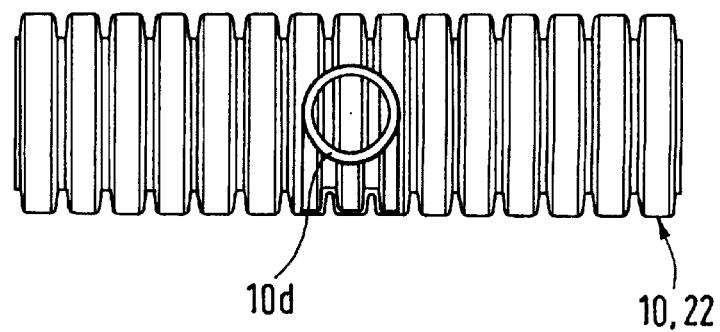

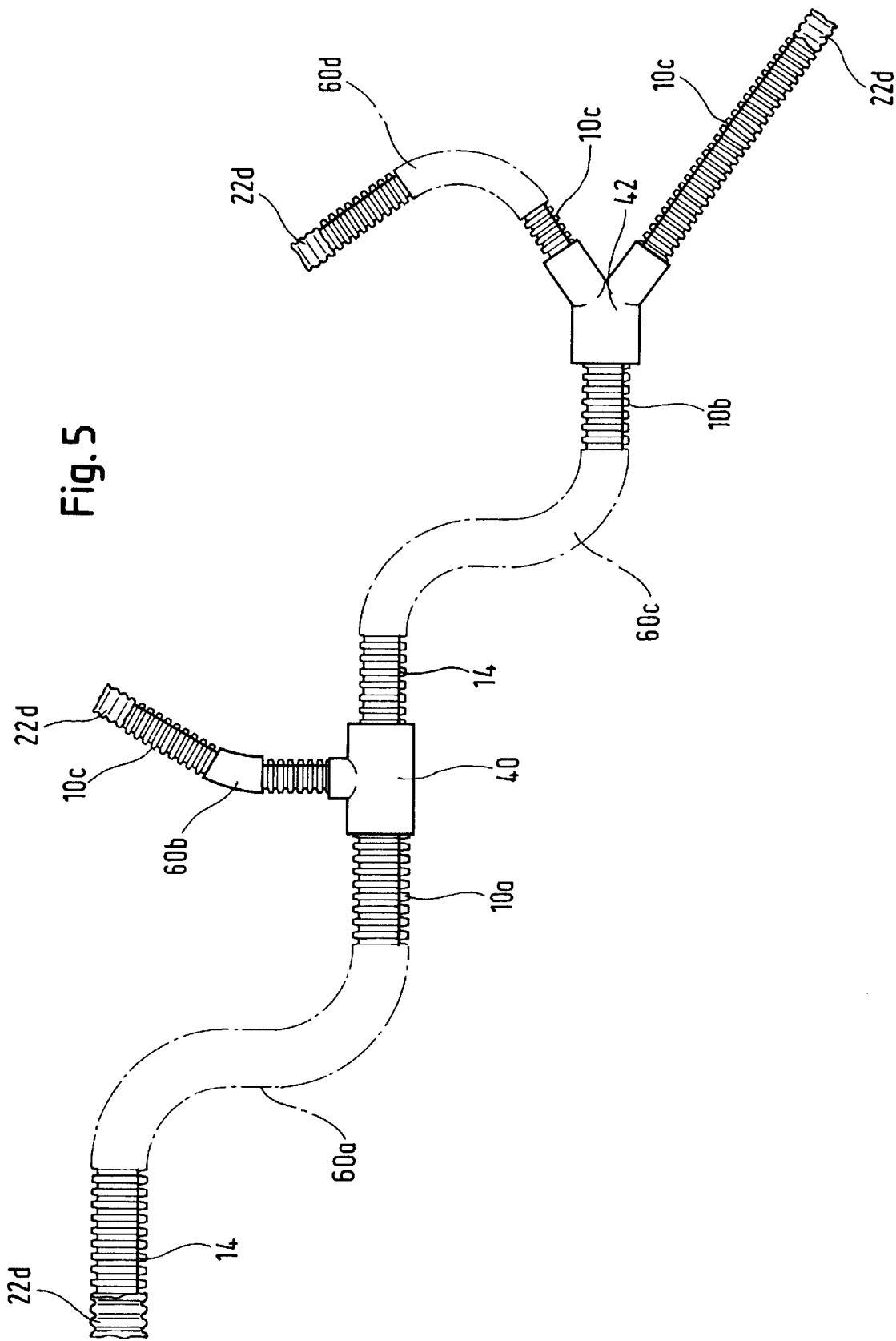

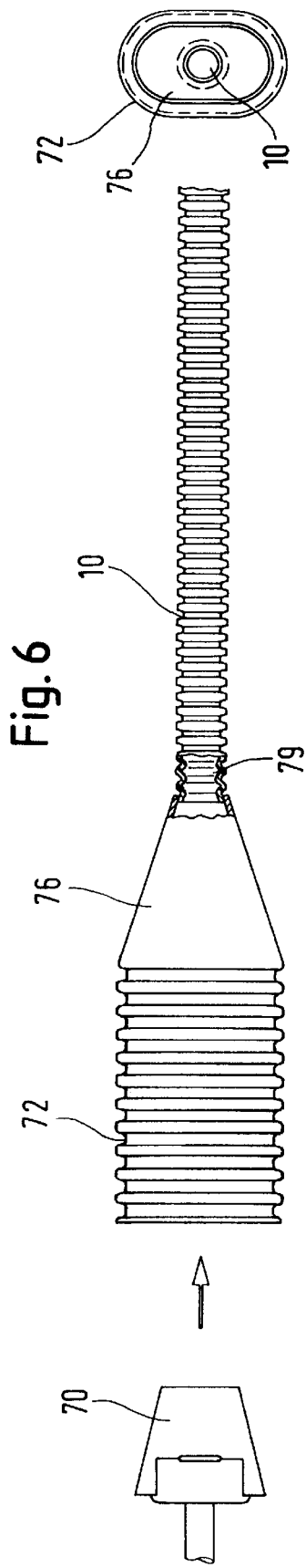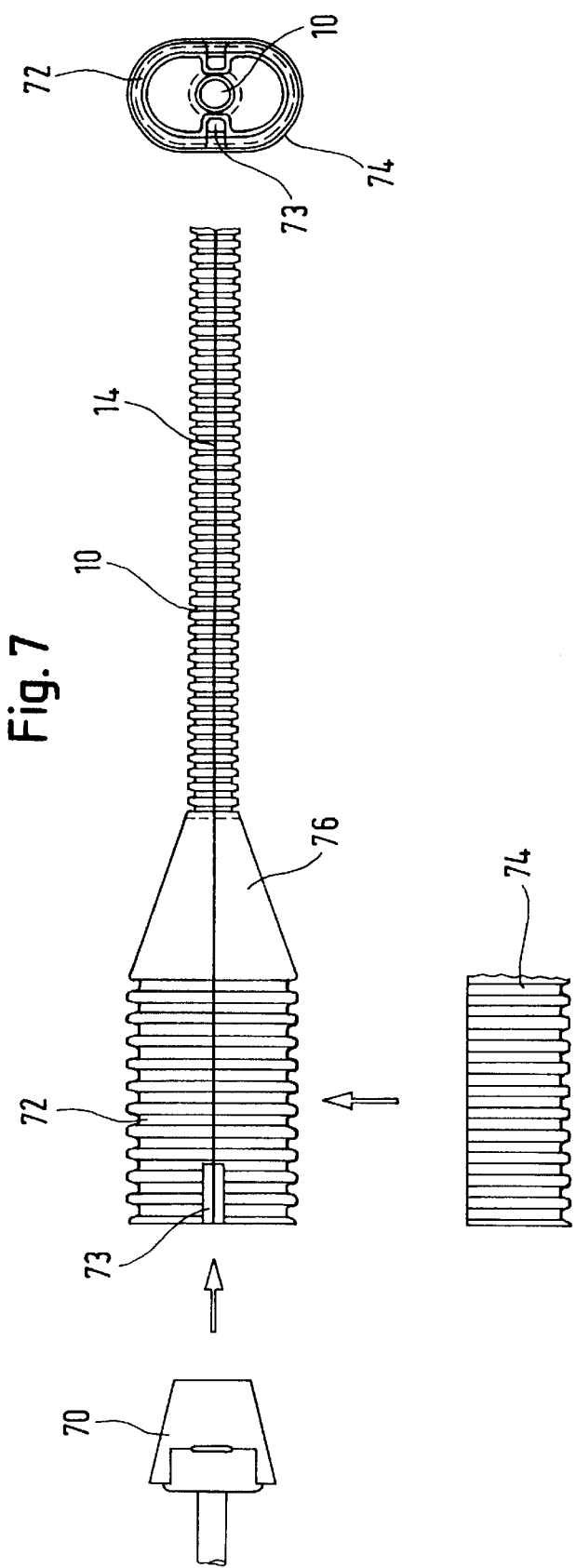

PIPE-ARRANGEMENT

FIELD OF THE INVENTION

The invention relates to a pipe arrangement with a corrugated pipe, which includes a slit in axial direction, and especially to protective pipe arrangements which are used in motor vehicle manufacture to protect and install electrical conductors and the like.

BACKGROUND OF THE INVENTION

Generic protective pipe arrangements including slitted corrugated pipes for the automotive field are known, for example, from EP 0 268 869 B1. WO 97/32379 discloses a protective pipe which is provided with a slit that is inwardly covered by an overlapping portion. This type of protective pipe for electrical cables has the disadvantage that a strong stiffening of the pipe along the slit and overlap regions results so that, when the pipe is installed, for example, in a bent condition in the engine compartment of a motor vehicle, it gapes apart and exposes the electrical cables to be protected to the environment. Furthermore, it is problematic with this arrangement to guide electrical conductors out of this protective pipe through the slit, since the covering portion for the slit exerts localized stress on the electrical conductors and leads, especially together with the effect of large temperature variations and the vibrations in the engine compartment to the conducting cores of the electrical cables being exposed, which is especially problematic in modern vehicles, since here electrical and electronical control conductors can be used which are responsible for a reliable operation of the vehicle. It is furthermore extremely cumbersome to manufacture this type of pipe, since the covering region must be manufactured together with the pipe in a closed shape and, subsequently, sawed through from one side in order to open the slit. Subsequently, the pipe must again be strongly heated and the pipe must be pressed together in the heated, at least partially softened condition in order to close the slit so that the overlapping region can carry out its covering function. This type of manufacture is time consuming and costly, and the result can in no way justify the cost. Because of the overlap, the cables are very hard to insert or only with a specialized tool.

A pipe with axial slit is known from DE 196 24 984 A1 wherein the slit has a longitudinal extent which deviates from a straight line. An ondulated line is here considered practical. However, deformations occur which are caused by the ondulated line in the pipe. It is also extremely difficult with this type of pipe arrangement to provide a slit which deviates from a straight line. Special tools must be used herefor which furthermore operate relatively slowly. The manufacturing costs are also not justified by the results and the cables are hard to insert and only with an auxiliary tool because of the overlap.

A wrapping channel for the wrapping of cable bundles is known from EP 0 750 378 A1 which is slitted in its longitudinal direction whereby a costly closure mechanism is formed along the slit. A stiffening of the protective pipe over its whole length is here also present, which is unacceptable.

EP 0 114 213 A2 discloses a protective pipe with a complicated hook-shaped closure. DE 44 10 706 A1 also discloses a pipe, especially a corrugated tube which is provided with costly closure mechanisms.

The generic prior art discloses a protective pipe arrangement for conduits and especially for electrical conductors, whereby two slitted corrugated pipes are inserted one into the other so that the inner or outer protective pipe covers the slit in the other protective pipe. This type of protective pipe arrangement is very advantageous with respect to protection for the electrical conduits, whereby deformations of this protective pipe arrangement along the slit are also prevented so that a squeezing of or an undesired insulation removal from the electrical cables is not possible, but this type of protective pipe arrangement requires a comparatively high amount of plastics material during manufacture and requires, especially with small pipe dimensions, a large force to install or uninstall the protective pipe arrangement. The very high installation cost also dampens the acceptance of this otherwise good concept.

SUMMARY OF THE INVENTION

Accordingly, it is an object of the present invention to correct as much as possible the above disadvantages of the prior art. Especially, a progressive pipe arrangement producible with comparatively little means is to be provided which is closable especially well and easily, but also gentle to the conduits or electrical cables.

This object is achieved with a pipe arrangement including a corrugated pipe having a first slit in axial direction, at least one pipe section with corrugations for engagement with the corrugated pipe and over a portion thereof in axial direction, whereby the pipe section includes a second longitudinal slit and is positionable on and in the corrugated pipe to cover the first slit.

The advantages achievable according to the present invention are based on the fact that the corrugated pipe of the pipe arrangement with features according to the invention can be engaged at selected locations with pipe sections, whereby the pipe sections themselves include longitudinal slits so that the pipe sections which cover the slit in the corrugated pipe can be placed thereover. The pipe sections remain on the corrugated pipe because of their inherent elasticity and cover the slit at selected locations. The pipe section, which is also preferably provided with corrugations, extends into the corrugations of the pipe arrangement, whereby it is not required, but preferred, that the corrugations of the corrugated pipe at the outer circumference of this pipe are complementary to the inner structure of the pipe section or pipe sections. In this manner, a corrugated pipe of about one meter length can be closed as far as the slit is concerned, for example, with two or three pipe sections of about 5 to 10 cm length, without stiffening of the corrugated pipe so that thereby the disadvantages of the above-discussed prior art are essentially prevented. Furthermore, only small amounts of additional material are required and the cost for the manufacture and processing of such a type of arrangement is easily acceptable. A surprisingly simple and advantageous pipe arrangement for the protection of electrical conduits, especially in motor vehicles, is thereby provided in accordance with the invention.

Of course, it is also possible to insert the pipe sections into the corrugated pipe so that the corrugated pipe surrounds the pipe sections. The advantages achievable thereby are analogous to the above-discussed pipe arrangement according to the invention, which is however preferred.

An especially advantageous embodiment of the invention results when the corrugated pipe or the pipe section or sections includes a rotation lock. The corrugated pipe can therefor have on its outer circumference a structure, for example, a hump or projection. The pipe section can get into locking engagement with this structure so that after installation of the pipe section on or in the corrugated pipe, the pipe section can no longer be rotated relative to the pipe. It can be prevented in this manner that the pipe section rotates relative to the first slit during vibrations or the like in the engine compartment of a motor vehicle which could lead to exposure of and access to the first slit in the corrugated pipe.

A misalignment or incorrect installation of the pipe section relative to the corrugated pipe can also be easily prevented with this structure of the corrugated pipe.

Of course, the pipe sections can also have a structure on their inner circumference which, for example, catches in the first slit of the corrugated pipe or on another opening or structure of the corrugated pipe in order to prevent rotation of the pipe section relative to the corrugated pipe. If the pipe section is inserted into the corrugated pipe, the structure of the pipe section can also be formed on an outer circumference.

The pipe sections are preferably constructed in axial direction such that relative to the corrugated pipe, they start and end in a corrugation trough of the corrugated pipe. In this manner, the pipe section, after it has been snapped onto the corrugated pipe from the outside, can no longer be influenced in axial direction, since the beginning and end of the pipe section are hidden in a corrugation trough of the corrugated pipe.

In that region wherein the pipe section is positioned onto the corrugated pipe, an opening is preferably achievable or already provided. Electrical conductors can be guided through this opening which, for example, is provided in the region of the rotation lock or at the first slit in the corrugated pipe in the form of a wart or the like that can be opened by cutting off, or a pipe junction can also be used in this region. It is also possible to develop corresponding openings, for example, by way of lines of weakness or the like.

A further advantageous embodiment with a diversion opening is achieved when the corrugated pipe as well as the pipe section are provided with left out regions, possibly openings or the like, so that after assembly of the pipe arrangement with features according to the invention, an opening remains through which either electrical conductors can be guided or to which another pipe section can be connected which can also be constructed according to the invention. When the corrugated pipe as well as the pipe section are both provided with a cutout, which cutouts, after assembly, combine to define a restricted opening, a gripping member can be created upon assembly which engages recesses in a pipe section to be added, for example, the corrugations of a corrugated pipe branch-off to be added. A pipe section is preferably provided to both sides of the opening or the branch-off in order to partially stabilize the corrugated pipe, especially in the region of the branch-off.

An especially advantageous embodiment is achieved when a pipe section in longitudinal or axial direction includes one or more stiffening members, which, after positioning of the pipe section onto the corrugated pipe, stiffen the latter. For this purpose, the corrugations can be partially left out in a pipe section of such construction or stiffening members can be formed during the manufacturing process in the corrugator. This type of manufacture has the advantage that in case it is desired to regionally stiffen the pipe arrangement with features according to the invention, one or more corresponding pipe sections can be positioned on the corrugated pipe in order to be able to install the corrugated pipe in a self-supporting manner, for example, over a specific length wherein the corrugated pipe cannot be fastened in an engine compartment.

A marking is preferably provided on the corrugated pipe where a pipe section is to be provided. Such a marking can be provided, for example, in the form of a sprayed on colour ink spot, or the like. This provides various labelling and marking possibilities up to and including the use of a laser. Special advantages are also associated with an embodiment wherein at least the corrugated pipe and possibly also the pipe sections are in axial direction provided with regions of different corrugation dimensions in order to create in this manner zones with different flexibility. Especially deep corrugations of the corrugated pipe can thereby provide the arrangement in accordance with the invention with additional flexibility, or especially shallow corrugations can make the arrangement in accordance with the invention regionally relatively stiff. A comparable effect can be achieved when the corrugated pipe in longitudinal direction includes regions which are made from materials of different flexibility, stiffness and/or the like.

A fastening region can be advantageously provided on the corrugated pipe and/or the pipe sections which can be engaged by a fastening device. The rotation lock which, for example, is provided in the form of a bulge on the other circumference of the corrugated pipe, can be constructed such that the fastening device can be affixed thereto. An embodiment has thereby proven especially advantageous wherein the fastening device includes two converging legs which cooperate with corresponding sections on the fastening region or on the rotation lock. In such a case, for example, the rotation lock can be constructed slightly longer in radial and/or axial direction of the corrugated pipe, than would be principally necessary for the securement of the pipe section. A corresponding fastening device can then be snapped thereonto, pushed thereonto, or the like.

A further advantageous embodiment results when fastening regions with an opening are present in the corrugated pipe and/or the pipe sections, into which opening the fastening device is inserted with an anchor portion in order to connect the fastening device through the angle portion with the corrugated pipe or the pipe section, for example, by locking together, adhering together, or the like.

It is possible without question to use the above embodiments with the fastening region and the fastening device also in other types of pipes. The features associated therewith can then themselves be inventive.

An especially advantageous embodiment according to the invention results when the pipe section with features according to the invention is provided with an adaptor portion which adapts the contour of the corrugated pipe at least partially or essentially to the contour of a plug. The contour of a plug can be, for example, oval, so that the adaptor portion at its end must also be constructed oval so that the adaptor section can be snapped onto a fitting structure of the plug, for example, a recess or the like, for example, by way of a corrugation. Of course, adhesion or friction welding can be used or the connection achieved in another way. The adaptor section can then be brought into engagement with the ondulated pipe, for example, by providing corrugations or corresponding structures of the adaptor portion which engage the corrugations of the pipe.

An especially preferred embodiment results when the adaptor portion is connectable with the corrugated pipe by way of a pipe section. Of course, parts of respectively two corrugated pipes can be connected together in the same manner by way of a pipe section.

The adaptor portion can, as already hinted at above, be circumferentially closed as well as slitted. Also, the corrugated pipe and, therefore, also the pipe section can of course have cross sections of a shape other than circular, for example, a rectangular cross section, an oval cross section, or the like. Of course, circular cross sections are preferred when it is desired to guarantee an even flexibility in each direction. Especial advantages can result when the adaptor portion is engageable with the corrugated pipe, possibly even by an interlocking structure. The preferably protruding structure which is otherwise used, for example, as rotation lock can here also be used, for example, to bring the corrugated pipe and the adaptor portion into a difficult to break or permanent engagement by rotation of the corrugated pipe relative to the adaptor portion.

In all connections between a plug and a pipe arrangement according to the invention or an adaptor portion, it is possible to provide a releasable plug-in connection as well as a permanent plug-in connection, for example, by friction welding, glueing, or the like.

It is recognizable as an especial advantage which is to be achieved according to the present invention that a sufficiently stable and, at the same time, easily accessible protective pipe arrangement can be provided which can be produced from a small number of parts that can be manufactured as continuous material. It is known in the art to use clamp-type arrangements for the connection to or closing of the slit, whereby such clamp-type parts are however constructed as injection molded parts and are associated with unacceptably high cost. In contrast, as already mentioned, it is possible, according to the present invention, to continuously produce corrugated pipes which can be longitudinally slitted with simple means, whereby pipe sections with fixed preselected dimensions can be correspondingly constructed. The pipe sections can also be manufactured as continuous corrugated pipe which also only needs to be slitted. These pipe sections can therefore close the slit and replace the otherwise necessary, costly injection molded parts.

A similar situation applies with respect to the above-suggested adaptor portion which can also be manufactured by the manufacture of a continuous material web and subsequent separation.

The invention will be further described in the following by way of preferred embodiments with features according to the invention. Further features, advantages and objects according to the present invention are disclosed thereby with reference to the attached illustrations, wherein:

FIG. 1 shows a cross section through a corrugated pipe with features according to the invention;

FIGS. 2A to D show different types of pipe sections in side view, while FIG. 2E is a plan view of the pipes according to FIGS. 2A to 2D;

FIG. 3 shows an arrangement of pipes with features according to the invention schematically and in side view;

FIGS. 4A/4B illustrate an embodiment for the connection of a pipe branch-off in side view and in top view, whereby FIG. 4C is a variation of the embodiment according to FIGS. 4A and 4B;

FIG. 5 is an embodiment according to FIG. 3 in an exemplary installation situation;

FIG. 6 is an embodiment with adaptor portion partly in cross section and partly in side view; and FIG. 7 is an alternative to the embodiment of FIG. 6 in analog illustration.

The same or at least functionally equivalent parts are referred to in the Figures with the same or at least similar reference numbers.

Figure 1:
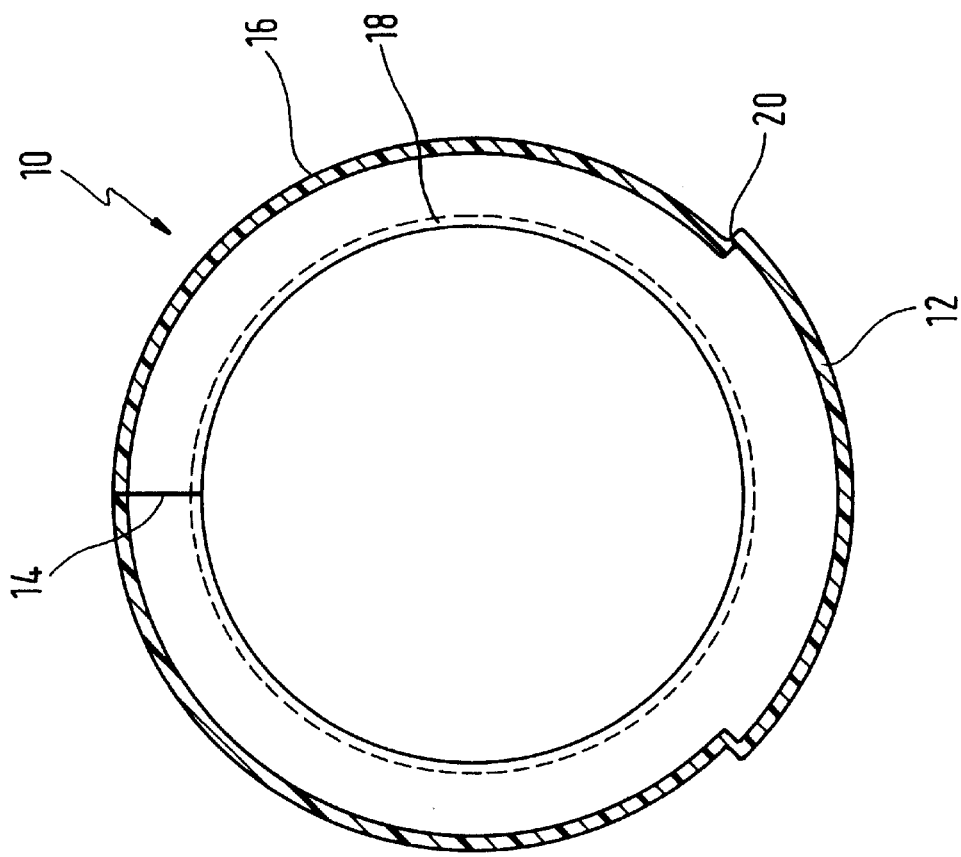

A corrugated pipe of the corrugated pipe arrangement according to the present invention has been designated in general in FIG. 1 by the reference number 10. The corrugated pipe 10 which is, in general, manufactured from plastic, includes corrugation crests 16 and corrugation troughs 18 which determine the outer and inner circumference of the plastic corrugated pipe 10. The corrugated pipe 10 is on one side provided with a slit 14. Opposite the slit 14 is a rotation lock 12 which is provided in the shape of a protrusion which on each side includes respective stop shoulders 20. When the corrugated pipe 10 is to be stabilized, a pipe section (see FIGS. 2A to 2E) is mounted onto the pipe 10 and which, with the ends of its legs in circumferential direction, engages the shoulders 20 of the corrugated pipe 10 in order to prevent rotation of the pipe section 22 according to FIGS. 2A to 2E relative to the slit 14 of the corrugated pipe 10.

Figure 2:
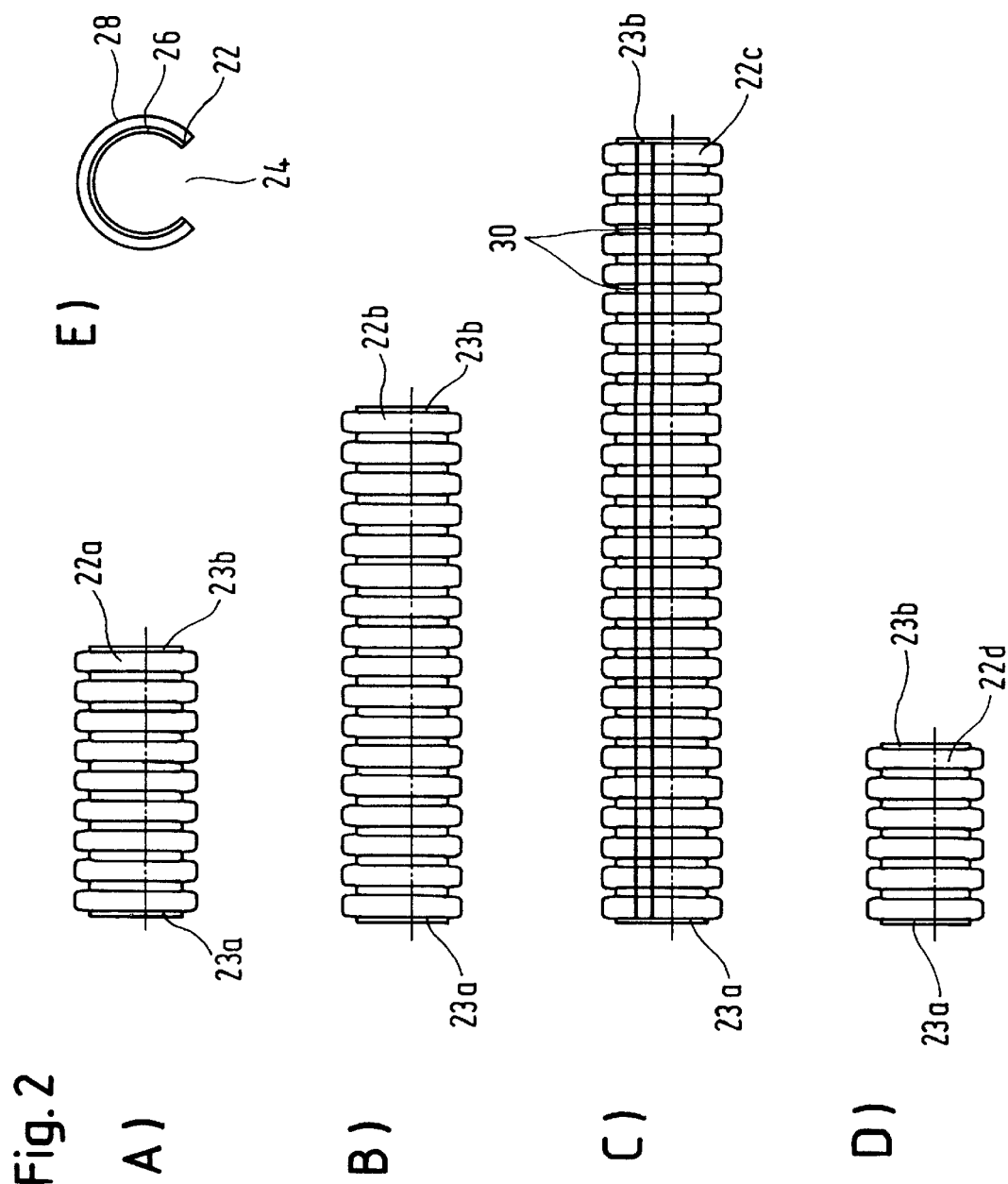

FIGS. 2A to 2E describe pipe sections 22 as they are designated overall in FIG. 2E. FIG. 2E shows a pipe section 22 in end view which means the direction of view extends in axial direction of the pipe sections 22a to 22d illustrated in FIGS. 2A to 2D.

The pipe section 22 according to FIG. 2E includes a gaping longitudinal slit 24, the shape of which corresponds to the rotation lock 12 according to FIG. 1. The reference numerals 26 and 28 respectively designate corrugation troughs and corrugation crests of the pipe section 22 which is also constructed as a corrugated pipe and is preferably made of plastic.

It is apparent in general from FIGS. 2A to 2D that the respective pipe sections 22a to 22d respectively end in a corrugation trough so that, when the pipe section is brought into engagement with the corrugated pipe 10, the pipe section is not accessible in axial direction for any possible unwanted removal from its operational position on the corrugated pipe 10.

The pipe section according to FIG. 2C shows two exemplary stiffening ribs 30 which extend in longitudinal direction of the pipe section for the stiffening thereof.

Figure 3:
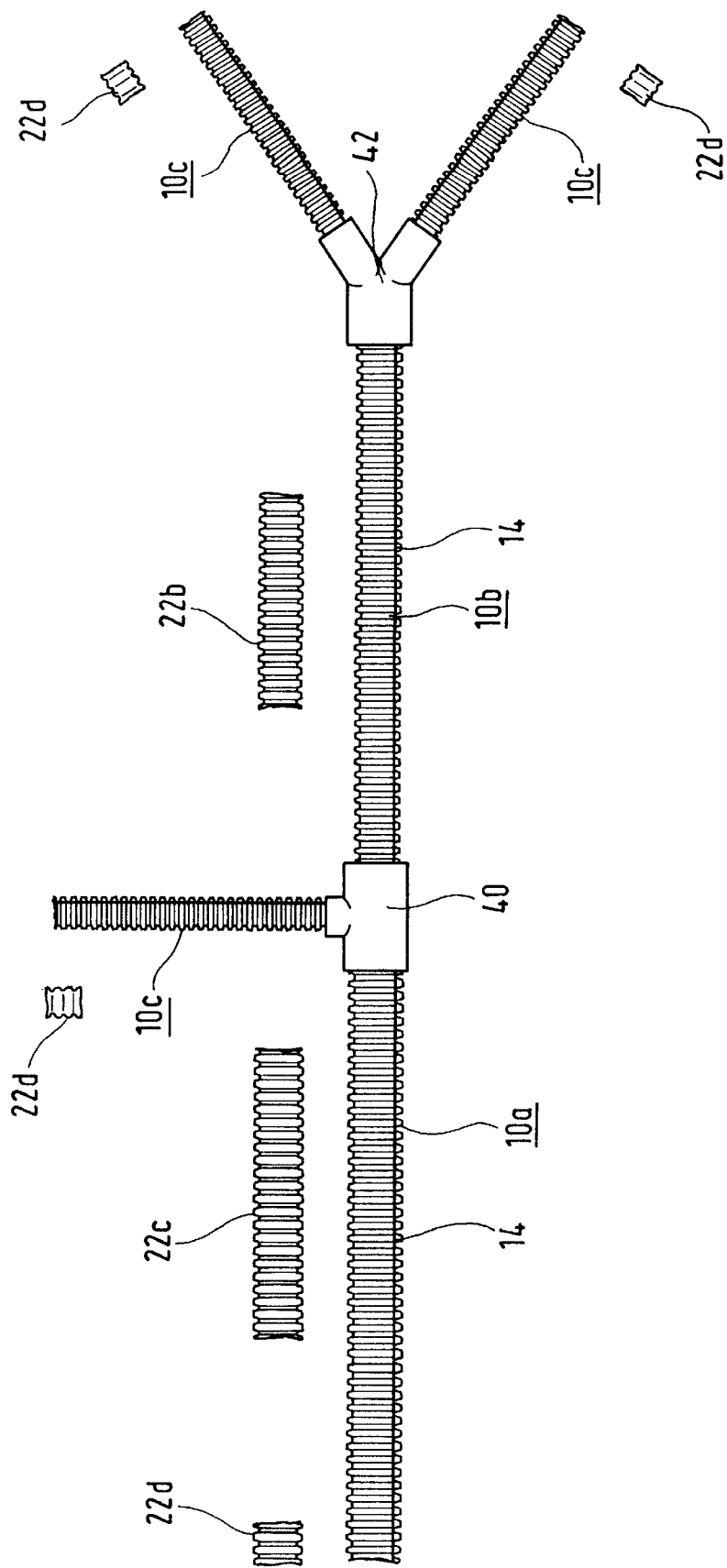

FIG. 3 shows an arrangement of several pipe arrangements according to the invention which are interconnected by way of connecting sections 40, 42. The connecting sections 40, 42, which means a T connection 40 and Y split 42 can be constructed in conventional manner, which means made in the form of halves which are interconnectable through snap-together portions. Of course, the halves can also be connected on one side through a living hinge so that the halves can be rotated towards one another and then closed by way of snap-together arrangements. Of course, they can also be adhered together.

If a cable tree is installed and branched off by way of the arrangement shown in FIG. 3, the cables, in the illustration come from the left and are branch-off and guided off in a direction to the right. According to the number of cables, the corrugated pipe 10a is provided with a correspondingly large diameter. A slit 14 extends along the corrugated pipe 10a which can be partially closed by pipe sections 22c and/or 22d, whereby the corrugated pipe 10a is held together by the pipe section 22c and 22d. In the intermediate portions between the pipe sections 22c and 22d, the corrugated pipe is still extremely flexible and, since no stiffening is present along the slit 14, for example, by closure arrangements or the like, the pipe 10 does not gape open in the regions where it is not surrounded by a pipe section.

After the first pipe branch-off 40 follows a further corrugated pipe 10b with reduced diameter which is in the same way closed by and stabilized with a pipe section 22b of reduced diameter. A branch-off 10c is kept closed on one side by the arrangement 40 and can along its further extent be stabilized and closed by a differently dimensioned pipe section 22d.

The pipe sections 10c provided beyond the Y split branch-off are correspondingly constructed and are, again, stabilized and closed with respective pipe sections 22d.

A possible alternative to the embodiment according to FIG. 3 results according to FIGS. 4A to 4C. As is apparent, according to FIG. 4A, the corrugated pipe 10 and the pipe section 22 are combined to a pipe arrangement in accordance with the features of the present invention. Both portions are thereby provided with a smooth wall section 34 which can be manufactured by appropriately constructing the shaping jaws of a corrugator. In the region 34, a recess, opening or the like can be provided in the corrugated pipe 10, as well as in the pipe section 22, which overlap in the installed situation in order to create an egress opening or an egress section 36 into which a corresponding pipe, especially a corrugated pipe 10c, preferably with features according to the invention, can be inserted. The respective edge regions of the corrugated pipe 10 and the pipe section 22 which are associated with the secondary corrugated pipe 10c can form interlocking portions which fix the corrugated pipe 10c and engage a corrugation trough of the corrugated pipe 10c.

FIG. 4B shows an arrangement according to FIG. 4A in an end view of the secondary pipe or the corrugated pipe 10c.

In the variant according to FIG. 4C, the corrugated pipe 10 can be provided with a branch-off connector 10d which forms a branch-off to which a pipe, a corrugated pipe or the like can be connected. Otherwise, it is of course also possible to simply provide a cutout in the corrugated pipe 10 and/or in the pipe section 22 into which a pipe branch-off 10d can be inserted. There are various possibilities herefor which, however, will not be discussed in detail.

FIG. 5 shows an embodiment according to FIG. 3 in an installed installation situation. The parts shown in FIG. 5 have already been discussed in principle with reference to FIG. 3. It only needs to be added that in the regions 60a, 60b, 60c and 60d, the pipes 10a, 10b, 10c are bent, as this can be the case in the engine compartment. As is apparent, the pipes do not gape open in the regions of bending, as would be the case with prior art pipes. Pipe sections can be provided in the bent regions 60a, 60b, 60c, and 60d, especially also in sections and snapped thereonto, whereby a slight stiffening results, which, however, still provides for a good flexibility without the generation of kink locations and without the slit 14 gapping open.

FIG. 6 shows a corrugated pipe 10 to which end an adaptor portion 76 is mounted which merges into an oval corrugated pipe 72. The top view of the corrugated pipe 72 shown on the right shows the transition region of the adaptor portion 76 and centrally the connecting opening for the corrugated pipe 10. The partially cutaway illustration region 79 shows that the corrugated pipe 10 at the adjacent end of the adaptor portion 76 is inserted into the latter.

The oval corrugated pipe 72 is pushed over a plug 70 whereby the latter is engageable with the pipe 72 by way of a recess or another structure.

Alternatively, the oval corrugated pipe according to FIG. 7 can be provided with one or two slits 73 at the end adjacent the plug 70. Here, the oval pipe 72 can be brought more easily into engagement with the plug 70. In case this connection is not strong enough, a slitted pipe section 74 can be pushed thereonto which provides additional hold and sealing.

What is claimed is:

1. Pipe arrangement, comprising a corrugated pipe having an axially extending slit, and at least one pipe section with corrugations engageable with the corrugated pipe over an axial portion thereof, the pipe section including a longitudinal slit and being engageable with the corrugated pipe for covering the axial slit therein, wherein the pipe section, when engaged, is positioned around an exterior of the corrugated pipe.

2. Pipe arrangement according to claim 1, wherein at least one of the corrugated pipe and the pipe section include a rotation lock for limiting rotation of the pipe section relative to the corrugated pipe.

3. Pipe arrangement according to claim 2, wherein the corrugated pipe on its outer circumference includes a structure for engaging a portion of the pipe section to prevent rotation thereof relative to the corrugated pipe.

4. Pipe arrangement according to claim 2, wherein the rotation lock is a structure on an inner circumference of the pipe section for engagement with a cooperating structure of the corrugated pipe.

5. Pipe arrangement as defined in claim 4, wherein the cooperating structure is the axially extending slit of the corrugated pipe.

6. Pipe arrangement according to claim 1, wherein the pipe section is corrugated and constructed to commence in axial direction in a first corrugation trough of the corrugated pipe and to end in a second corrugation trough of the corrugated pipe.

7. Pipe arrangement according to claim 1, wherein at least one opening is provided in at least one of the corrugated pipe and the pipe section to provide a diversion or branch opening created upon assembly of the corrugated pipe and the pipe section.

8. Pipe arrangement according to claim 7, wherein the opening is in the form of a left out region in both the corrugated pipe and the pipe section to provide the opening for insertion or fastening of a connecting pipe.

9. Pipe arrangement according to claim 8, wherein:
the pipe section extend includes longitudinally extending stiffening means for stiffening the corrugated pipe upon engagement of the pipe section with the corrugated pipe; at least one of the corrugated pipe and the pipe section include a fastening region for engagement with a fastening device;
an adaptor portion is provided for adapting contours of the corrugated pipe to contours of a plug; the adaptor portion is fitted onto the corrugated pipe by way of a pipe section covering at least one of the slit of the corrugated pipe and a portion of the adaptor portion;
the adaptor portion is engageable with at least one of the corrugated pipe and the pipe section and has an axial slit; and
the corrugated pipe when mounted to the adaptor portion at least partially overlaps the adaptor portion in such a way to permit mounting of a pipe section thereonto.

10. Pipe arrangement according to claim 9, wherein at least one of the corrugated pipe and the pipe section include regions of corrugations which differ in at least one of shape and dimensions from adjacent regions of corrugations in order to create zones of different flexibility.

11. Pipe arrangement according to claim 9, wherein at least one of the corrugated pipe and the pipe section include an axially extending portion of a material having one of different flexibility and stiffness in order to create zones of different flexibility.

12. Pipe arrangement according to claim 1, wherein the pipe section includes longitudinally extending stiffening means for stiffening portion of the corrugated pipe upon engagement.

13. Pipe arrangement according to claim 1, wherein at least one of the corrugated pipe and the pipe section include regions of corrugations which differ in at least one of shape and dimensions from adjacent regions of corrugations in order to create zones of different flexibility.

14. Pipe arrangement according to claim 1, wherein at least one of the corrugated pipe and the pipe section include an axially extending portion of a material having one of different flexibility and stiffness in order to create zones of different flexibility.

15. Pipe arrangement according to claims 1, wherein at least one of the corrugated pipe and the pipe section include a fastening region for engagement with a fastening device.

16. Pipe arrangement according to claims 1, further comprising an adaptor portion for adapting contours of the corrugated pipe to contours of a plug.

17. Pipe arrangement as defined in claim 16, wherein the adaptor portion is fitted onto the corrugated pipe by way of a pipe section covering at least one of the slit of the corrugated pipe and a portion of the adaptor portion.

18. Pipe arrangement according to claim 16, wherein the adaptor portion is engageable with at least one of the corrugated pipe and the pipe section and has an axial slit.

19. Pipe arrangement according to claim 18, wherein the corrugated pipe when mounted to the adaptor portion at least partially overlaps the adaptor portion in such a way to permit mounting of a pipe section thereonto.

20. Pipe arrangement according to claim 1, wherein:

at least one of the corrugated pipe and the pipe section include a rotation lock for limiting rotation of the pipe section relative to the corrugated pipe;

the corrugated pipe on its outer circumference includes a structure for engaging a portion of the pipe section to prevent rotation thereof relative to the corrugated pipe;

the rotation lock is a structure on an inner circumference of the pipe section for engagement with a cooperating structure of the corrugated pipe; and the cooperating structure is the axially extending slit of the corrugated pipe.

* * * * *

UNITED STATES PATENT AND TRADEMARK OFFICE
CERTIFICATE OF CORRECTION

PATENT NO. : 6,129,120
DATED : October 10, 2000
INVENTOR(S) : Christian Margot

It is certified that error appears in the above-identified patent and that said Letters Patent is hereby corrected as shown below:

Column 6,
Line 10, "section (see" should read -- section 22 (see --;

Column 8, claim 10,
Line 57, "according to claim 9" should read -- according to claim 1 --; and Column 8, claim 11,
Line 62, "according to claim 9" should read -- according to claim 1 --.

Signed and Sealed this

Sixteenth Day of April, 2002

Attest:

JAMES E. ROGAN
*Director of the United States Patent and Trademark Office*

*Attesting Officer*